United States Patent [19]

Allen

[11] 3,997,682
[45] Dec. 14, 1976

[54] OLEAGINOUS FOOD FLAVORED WITH CERTAIN ALPHA CARBOXY ACIDS AND/OR ESTERS THEREOF

[75] Inventor: Robert R. Allen, Plano, Tex.

[73] Assignee: Anderson, Clayton & Co., Houston, Tex.

[22] Filed: Dec. 4, 1972

[21] Appl. No.: 311,803

Related U.S. Application Data

[63] Continuation-in-part of Ser. No. 174,932, Aug. 25, 1971, abandoned.

[52] U.S. Cl. .............................................. 426/534
[51] Int. Cl.² ....................................... A23L 1/226
[58] Field of Search ................... 426/65, 175, 534

[56] References Cited

UNITED STATES PATENTS

| | | | |
|---|---|---|---|
| 658,529 | 9/1900 | Poppe ............................ | 426/65 X |
| 2,527,785 | 10/1950 | Armstrong ..................... | 426/152 |
| 2,819,169 | 1/1958 | Boldingh ........................ | 426/65 |
| 3,490,921 | 1/1970 | Melnick ......................... | 426/65 |

OTHER PUBLICATIONS

Fenaroli's Handbook of Flavor Ingredients, 1971, The Chemical Rubber Co., Cleveland, Ohio, pp. 303, 304, 307, 318, 380.

*Primary Examiner*—Joseph M. Golian
*Attorney, Agent, or Firm*—Fulbright & Jaworski

[57] ABSTRACT

A flavored neutral oleaginous food is prepared by blending together a neural oleaginous food with a minor amount of (i) alpha carboxy butyric, isobutyric, valeric, isovaleric, caproic, capric or caprylic acid and/or (ii) one or more of the ethyl or butyl esters of those alpha carboxy acids.

9 Claims, No Drawings

OLEAGINOUS FOOD FLAVORED WITH CERTAIN ALPHA CARBOXY ACIDS AND/OR ESTERS THEREOF

CROSS-REFERENCES TO RELATED APPLICATIONS

This is a continuation-in-part of U.S. Pat. application No. 174,932 filed Aug. 25, 1971 and now abandoned.

BACKGROUND OF THE INVENTION

The field of art to which the invention pertains is the flavoring of oleaginous food and more particularly to producing favorable flavors and resisting unpleasant odor production when heated.

The acids and esters described in the Abstract of the Disclosure, when blended with a neutral oleaginous food, give a flavored food that (i) is resistant to the production of the typical unpleasant acrid odor which accompanies the normal heating of oleaginous material such as oils and (ii) develops and retains a favorable odor and flavor after being heated.

In the opinion of the Applicant, the closest prior art to which he has knowledge is U.S. Pat. No. 2,527,785 issued Oct. 31, 1950 to Jack W. Armstrong for Butter Flavoring Composition which discloses the use of butyric acid, butyric acid esters, and butyric acid salts as a flavoring material with acidic food compositions. However, that patent does not disclose the present development.

SUMMARY OF THE INVENTION

It is the general object of the present invention to provide a composition of matter which is a flavored neutral oleaginous food that is resistant to the production of unpleasant odors when heated and which upon heating will develop a favorable odor and flavor of its own that is retained after cooling.

Other and further objects, features and advantages will be apparent from the following description of the invention given for the purpose of disclosure.

The present invention is based upon the discovery that a flavored neutral oleaginous food, as described in the stated object of this invention, can be economically produced by blending a neutral oleaginous food with a minor amount of (i) at least one of the alpha carboxy acids selected from the group consisting of alpha carboxy butyric, isobutyric, valeric, isovaleric, caproic, capric and caprylic acid and/or (ii) at least one of the ethyl or butyl esters of those acids. Margarine and cooking oils are normally neutral and they are the preferred neutral oleaginous material. Preferably both an acid and an ester are added to these oleaginous materials rather than using an ester or acid alone.

When an ester alone is used with one of these oleaginous materials, it gives a sweet flowery flavor. The use of the acid without an ester gives a buttery flavor. But the combination of the two yields a generally more desirable sweet buttery flavor.

The preferred acid is alpha carboxy butyric acid, the preferred ester is the butyl ester of alpha carboxy butyric acid, and the preferred combination is the combination of the last mentioned acid and ester.

Only minor amounts of these alpha carboxy acids and esters need to be used with the amount depending upon the level of the flavor and the amount of control of production of unfavorable odors that is desired. The term "minor amount," as used herein, means the range between a lower end of about 1 part per million of either the ester or the acid, or combined ester and acid, and an upper end of approximately 50 parts per million of the ester, or 100 parts per million of the acid, or a total of 100 parts per million total where both the acid and ester are both used. The presently preferred additive is a combination of 10 parts per million of alpha carboxy ethyl butyrate and 40 parts per million of alpha carboxy butyric acid.

To contrast the present invention, tests were run in which 200 ml. of a neutral cooking oil (partially hydrogenated soybean oil), with or without additives, were poured into an electric controlled frying pan set at 320° F. The oil was heated for 10 minutes at 320° F. and the odor of the oil observed. The oil was poured into a beaker, allowed to cool for one hour, and then tasted. Where they was no additive, the oil, when heated, had a typical hot oil odor, and its flavor, when later cooled, was rancid and oxidized. When either 50 parts per million of sodium butyrate or 50 parts per million of potassium butyrate (certain additives suggested in the above-mentioned U.S. Pat No. 2,527,785 to Jack W. Armstrong) were added, the cooking oil, when hot, had a typical hot oil odor, black specks developed and, when the oil cooled, it became rancid and oxidized. Similarly, when the additive was 20 parts per million of ethyl butyrate (another additive suggested by the aforesaid U.S. Pat. No. 2,527,785), the odor of the hot oil was estery and sweet for about 2 minutes but, when it cooled, it became rancid and oxidized. Contrasted with this, when 50 parts per million of alpha carboxy butyric acid, as suggested by Applicant, was blended with the oil, it had a buttery sweet odor when hot, and a buttery and slightly oxidized flavor after cooling. Similarly, when 20 parts per million of alpha carboxy ethyl butyrate, again suggested by Applicant, were blended with the cooking oil, it had an estery sweet odor for approximately 10 minutes when heated, and after cooling, had a sweet, buttery and estery flavor.

DESCRIPTION OF THE PREFERRED EMBODIMENTS

The various alpha carboxy acids referred to herein are available commercially and so their method of preparation need not be described. Applicant does not know of any commercial source of the ethyl and butyl esters of those alpha carboxy acids, but their method of preparation from the acids is easily within the skill of the art. However, certain examples of the preparation of those esters will be given.

Following are various examples of the present invention.

EXAMPLE 1

50 parts of alpha carboxy butyric acid were blended at room temperature with one million parts of cooking oil made of lightly hydrogenated soybean oil. The resulting oil had a bland flavor when cold but when heated to normal frying temperatures of 150° C. gave off a pleasant butyric acid odor. When the oil was cooled and tasted, it had a pleasant buttery flavor.

EXAMPLE 2

50 parts of alpha carboxy caproic acid were added to one million parts of the same cooking oil used in Example 1. The oil had a bland flavor when cold but when heated to normal frying temperatures of 150° C., a generally favorable caproic acid odor was noted. When the oil was cooled and tasted, a buttery caproic flavor remained.

EXAMPLE 3

50 parts of alpha carboxy valeric acid were added to one million parts of lightly hydrogenated soybean cooking oil. The oil had a bland flavor when cold but when heated to normal frying temperatures developed a pleasant valeric acid odor and flavor.

EXAMPLE 4

50 parts of alpha carboxy isovaleric acid were added to one million parts of lightly hydrogenated soybean cooking oil. The oil had a bland flavor when cooled, but when heated to normal frying temperatures gave off a pleasant isovaleric acid odor and flavor.

EXAMPLE 5

50 parts of alpha carboxy caprylic acid were added to one million parts of the same cooking oil used in Example 1. This oil also had a bland flavor when cold, but when heated to normal frying temperatures developed a pleasant caprylic acid odor and flavor, which flavor remained in the oil after it cooled.

EXAMPLE 6

200 grams of butter oil were deodorized by steam distillation at 150° C. and 0.2–5 mm. of Hg. absolute. The butter oil residue after this deodorization was blended with 300 grams of absolute ethanol and 6 grams of sodium ethoxide catalyst. The mixture was refluxed for one hour and then distilled at atmospheric pressure. The distillate fraction of ethyl esters that boiled from 78°–250° C. was collected. To 88 grams of sodium ethoxide in 400 ml. of benzene was added 320 grams of diethyl oxalate and the ethyl esters that were collected. The solution was refluxed for one hour and then distilled through a short column until the temperature reached 80° C. The solution was cooled and to it was added 250 mm. of water and 38 mm. of concentrated sulfuric acid (36 N.). Sufficient sodium chloride was added to saturate the solution with sodium chloride.

An organic layer and an aqueous layer formed. The aqueous layer was removed and extracted with ether. The organic layer and the ether used to extract the aqueous layer were combined, washed with brine solution and dried. The ether and excess diethyl oxalate were removed by atmospheric pressure distillation yielding a residue weighing 165 grams which boiled at 190° C. at 756 mm. of Hg. absolute and at 160° C. at 0.5 mm. of Hg. absolute. This was an alkylated malonate mixture. It was mixed with 170 grams of potassium hydroxide in one liter of alcohol.

After one hour refluxing, the solution was acidified with 6 N. hydrochloric acid. An organic and an aqueous layer formed. The aqueous layer was separated from the organic layer and washed with ether. The organic layer and the ether used in the washing were combined with the ether removed by atmospheric distillation. Crystallization of the residue from 300 mm. of hexane gave 77 grams of crystals and 76 grams of viscous oil as a residue that had a slight pleasant estery odor. The crystals were a mixture of alpha carboxy butter acids including alpha carboxy butyric, isobutyric, valeric, isovaleric, caproic, capric and caprylic acid. The residue was the ethyl esters of those acids. The crystals were added to a soybean cooking oil at from 20 to 100 parts per million which gave bland oil products. When these oils were heated to the usual frying temperature, no unpleasant acrid odor developed and instead a very pleasant butyric sweet ester aroma and flavor were produced with the flavor remaining in the oil products after they cooled.

EXAMPLE 7

Alpha carboxy butyl butyrate was prepared in the following manner. Ethyl dibutyl malonate was prepared and one mol was reacted with one-half mol of potassium hydroxide in water-alcohol. After one hour reflux, the solvents were evaporated and the residue dissolved in water and extracted with ether to remove unreacted material. The aqueous layer that formed was cooled in ice and acidified with hydrochloric acid. The cold solution was extracted with ether, the ether solution washed and dried, and then the ether was removed to yield 0.96 mols of alpha carboxy butyl butyrate. This alpha carboxy butyl butyrate was added to cooking oil in varying amounts between 2 and 100 parts per million. It gave a bland product which when heated to normal frying temperatures produced a sweet, butterscotch odor without the acrid odor of heated oil being present. The oil, after cooling, retained a sweet flavor and did not taste rancid as did a control sample that contained no alpha carboxy ester.

EXAMPLE 8

In this example, there was used alpha carboxy ethyl butyrate, alpha carboxy ethyl isobutyrate and alpha carboxy butyl butyrate. The alpha carboxy butyl butyrate was prepared as in Example 7. The alpha carboxy ethyl isobutyrate was prepared by the same process illustrated in Example 7 for the preparation of alpha carboxy butyl butyrate except the starting material was dimethyl diethyl malonate rather than ethyl dibutyl malonate. The alpha carboxy ethyl butyrate was prepared in the same manner that the alpha carboxy butyl butyrate of Example 7 was prepared except that the starting material was ethyl diethyl malonate rather than ethyl dibutyl malonate. To a margarine that contained the usual margarine flavors was added 10 parts per million of alpha carboxy ethyl butyrate, 10 parts per million of alpha carboxy ethyl isobutyrate and 10 parts per million of alpha carboxy butyl butyrate. When the margarine was heated, a pleasant estery, caramel-like odor developed after the other butter flavor had evaporated. Food fried in this new flavored margarine had a distinctive and good flavor. Also, when put on hot vegetables, the new margarine resulted in vegetables with enhanced flavor.

EXAMPLE 9

Rapeseed oil, upon being heated to 350° F. for 10 minutes in an open skillet, developed a flavor described as burning rubber, fried onions or painty. To compare with this, 50 parts per million alpha carboxy butyric acid and 20 parts per million alpha carboxy ethyl butyrate were mixed with rapeseed oil. When this mixture was heated to 350° F. for 10 minutes, the odor was buttery and pleasant, and after the heating period the mixture had a much better odor than the untreated rapeseed oil.

EXAMPLE 10

To one kilo peanut oil was added 40 parts per million of alpha carboxy ethyl valerate and 60 parts per million alpha carboxy butyric acid. This mixture, before heating, had a typical peanut flavor and odor, but when heated to 320° F., the mixture produced a very pleasant butyric buttery odor. When cooled, after being heated, the mixture tasted like butter oil.

From the foregoing discussions, examples and description of the invention, it is apparent that the objects set forth herein as well as others have been achieved. Those skilled in the art will recognize that the principles of this invention may be applied in several ways, ony a few of which have been examplified herein specifically. Accordingly, the invention is to be limited only by the spirit thereof and the scope of the appended claims.

What is claimed is:

1. Composition of matter comprising a blend of:
   a. a neutral oleaginous food and
   b. between about 1 and 100 parts per million of at least one of the alpha carboxy acids selected from the group consisting of alpha carboxy butyric, isobutyric, valeric, isovaleric, caproic, capric and caprylic acids.

2. Composition of matter comprising a blend of:
   a. a neutral oleaginous food and
   b. between about 1 and 50 parts per million of the ethyl ester of at least one of the alpha carboxy acids selected from the group consisting of alpha carboxy butyric, isobutyric, valeric, isovaleric, caproic, capric and caprylic acids.

3. Composition of matter comprising a blend of:
   a. a neutral oleaginous food and
   b. between about 1 and 50 parts per million of the butyl ester of at least one of the alpha carboxy acids selected from the group consisting of alpha carboxy butyric, isobutyric, valeric, isovaleric, caproic, capric and caprylic acids.

4. Composition of matter comprising a blend of:
   a. a neutral oleaginous food and
   b. between about 1 and 100 parts per million of (i) at least one of the alpha carboxy acids selected from the group consisting of alpha carboxy butyric, isobutyric, valeric, isovaleric, caproic, capric and caprylic acids and (ii) at least one of the esters selected from the class consisting of the ethyl and butyl esters of at least one of the alpha carboxy butyric, isobutyric, valeric, isovaleric, caproic, capric and caprylic acids.

5. The composition of claim 4 in which the alpha carboxy acid includes alpha carboxy butyric acid and the ester includes the butyl ester of alpha carboxy butyric acid.

6. The composition of claim 4 in which the neutral oleaginous food is selected from the group consisting of margarine and cooking oil.

7. The composition of claim 1 in which the neutral oleaginous food is selected from the group consisting of margarine and cooking oil.

8. The composition of claim 2 in which the neutral oleaginous food is selected from the group consisting of margarine and cooking oil.

9. The composition of claim 3 in which the neutral oleaginous food is selected from the group consisting of margarine and cooking oil.

* * * * *